(12) United States Patent
Simoes

(10) Patent No.: US 8,807,994 B2
(45) Date of Patent: Aug. 19, 2014

(54) METHOD FOR OPERATING A REGENERATIVE HEATER

(75) Inventor: Jean-Paul Simoes, Walferdange (LU)

(73) Assignee: Paul Wurth S.A., Luxembourg (LU)

( * ) Notice: Subject to any disclaimer, the term of this patent is extended or adjusted under 35 U.S.C. 154(b) by 302 days.

(21) Appl. No.: 13/320,789

(22) PCT Filed: May 11, 2010

(86) PCT No.: PCT/EP2010/056422
§ 371 (c)(1),
(2), (4) Date: Nov. 16, 2011

(87) PCT Pub. No.: WO2010/133476
PCT Pub. Date: Nov. 25, 2010

(65) Prior Publication Data
US 2012/0064471 A1   Mar. 15, 2012

(30) Foreign Application Priority Data

May 20, 2009 (LU) .......................................... 91572

(51) Int. Cl.
*F27D 17/00* (2006.01)

(52) U.S. Cl.
USPC .......................................... 432/182; 432/180

(58) Field of Classification Search
USPC ............ 432/28, 179, 180, 181, 182; 165/4–8; 431/9, 11, 164; 126/91 A
See application file for complete search history.

(56) References Cited

U.S. PATENT DOCUMENTS

| | | | | |
|---|---|---|---|---|
| 4,444,555 A | * | 4/1984 | Edwardsen et al. | 432/30 |
| 5,161,968 A | * | 11/1992 | Nutcher et al. | 432/179 |
| 5,184,951 A | * | 2/1993 | Nutcher et al. | 432/28 |
| 5,203,859 A | * | 4/1993 | Khinkis et al. | 432/30 |
| 5,823,770 A | * | 10/1998 | Matros et al. | 432/181 |

(Continued)

FOREIGN PATENT DOCUMENTS

| EP | 0611270 A | 8/1994 |
|---|---|---|
| JP | 59056506 A | 4/1984 |

OTHER PUBLICATIONS

International Search Report PCT/EP2010/056422; Dated Jun. 18, 2010.

*Primary Examiner* — Gregory A Wilson
(74) *Attorney, Agent, or Firm* — Cantor Colburn LLP

(57) ABSTRACT

A method for operating a regenerative heater including a first chamber and a second chamber, the first chamber having a burner arranged therein, the second chamber having heat storage means; the method including: a heating cycle where fuel and oxidizing gas are fed to the burner of the first chamber and allowed to burn and where hot flue gasses are led through the second chamber to heat the heat storage means; and a blowing cycle where a process gas is fed through the second chamber to pick up heat from the heat storage means where the heating cycle includes the following steps: feeding a first stream of fuel to the burner of the regenerative heater; feeding a second stream of fuel to a pre-combustion chamber; feeding oxygen to the pre-combustion chamber; allowing the second stream of fuel and the oxygen to interact so as to form oxidizing gas; feeding the oxidizing gas to the burner of the regenerative heater, where, at the end of the heating cycle, the supply of oxygen to the pre-combustion chamber is discontinued, while further feeding the second stream of fuel to the pre-combustion chamber and further feeding the first stream of fuel to the burner.

13 Claims, 4 Drawing Sheets

(56) References Cited

U.S. PATENT DOCUMENTS

| | | | |
|---|---|---|---|
| 5,957,684 A * | 9/1999 | Nakagawa | 432/181 |
| 6,250,916 B1 * | 6/2001 | Philippe et al. | 432/29 |
| 6,261,093 B1 * | 7/2001 | Matros et al. | 432/181 |
| 6,289,851 B1 * | 9/2001 | Rabovitser et al. | 122/95.2 |
| 6,488,076 B1 * | 12/2002 | Yasuda et al. | 165/4 |

* cited by examiner

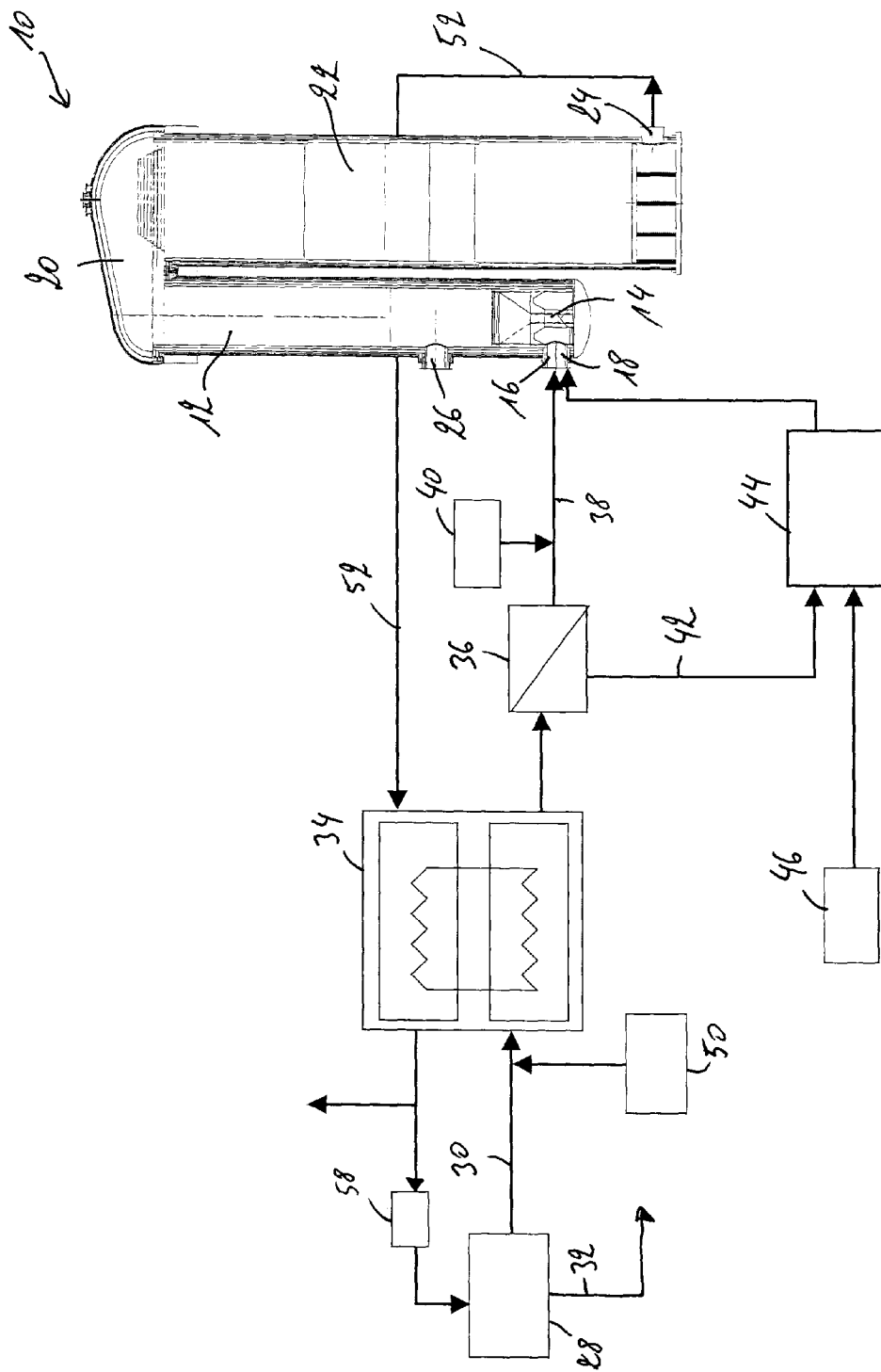

METHOD FOR OPERATING A REGENERATIVE HEATER

TECHNICAL FIELD

The present invention generally relates to a method for operating a regenerative heater, such as a hot blast stove of a blast furnace. More particularly, the present invention relates to an improved heating cycle of such a regenerative heater.

BACKGROUND

Blast furnaces are generally fed with hot blast air received from a regenerative heater such as a hot stove or a pebble heater. Such a regenerative heater generally comprises a first column and a second column, fluidly connected at the top by a cupola. A burner is arranged in the lower portion of the first column for burning a fuel and an oxidizing gas. The hot flue gasses created by the burning rise through the first column towards the cupola where they are directed into the second column. The second column is filled with checker bricks for absorbing heat from the hot flue gasses. The flue gasses then exit the second column via an opening in the lower portion of the second column. After the heating cycle, the regenerative heater is switched to a blowing cycle wherein cold air is generally fed into the regenerative heater through the opening in the lower portion of the second column. As the cold air flows through the second column filled with hot checker bricks, heat is transferred from the checker bricks to the cold air, thereby heating up the air. At the top of the second column, the hot air then flows into the first column via the cupola. The hot air finally exits the first column via a blast opening arranged above the burner. The hot air is then fed as hot blast air to the blast furnace.

Such regenerative heaters and their operation are well known to the skilled person and are generally used to heat blast air to a temperature of up to about 1250° C. for injection into the blast furnace. In recent years, the used of top gas recirculation installations has come into the limelight in order to reduce $CO_2$ emissions into the atmosphere. Such top gas recirculation installations recover top gas from the top of the blast furnace and feed the recovered top gas through a recycling process before injecting it back into the blast furnace. The recycling process comprises an initial cleaning of the top gas to remove e.g. dust particles, before the top gas is subjected to a $CO_2$ removal. The top gas is fed through a $CO_2$ removal unit in which $CO_2$ is removed from the top gas, generally by pressure swing adsorption (PSA) or vacuum pressure swing adsorption (VPSA). The $CO_2$ removal unit produces two streams of gas: a $CO_2$ rich tail gas and a CO rich process gas. The $CO_2$ rich tail gas is generally fed through a cryogenic unit to separate pure $CO_2$ out of the $CO_2$ rich tail gas. The pure $CO_2$ is subsequently generally pumped into the ground for storage. The CO rich process gas may be heated and fed back into the blast furnace as reducing gas.

The heating of the CO rich process gas may be carried out in regenerative heaters. The replacement of cold blast air with CO rich process gas, i.e. a reducing gas, however has implications for the operation of the regenerative heaters. Indeed, the oxidizing gas fed to the regenerative heater during the heating cycle is not compatible with the reducing gas fed through the regenerative heaters during the blowing cycle. In order to avoid that oxidizing gas is in the regenerative heater when the reducing gas is fed through, it may be suggested to carry out a purging of the regenerative heater before the blowing cycle is started. Purging the regenerative heater with at least three times its volume however is expensive, time consuming and unnecessarily reduced the temperature of the checker bricks.

BRIEF SUMMARY

The invention provides an improved method for operating a regenerative heater, wherein the method allows safely heating a reducing gas in the regenerative heater.

The present invention proposes a method for operating a regenerative heater, in particular a hot blast stove of a blast furnace, the regenerative heater comprising a first chamber and a second chamber, the first chamber having a burner arranged therein, the second chamber comprising heat storage means. Such a method comprises a heating cycle wherein fuel and oxidizing gas are fed to the burner of the first chamber and allowed to burn and wherein hot flue gasses are led through the second chamber to heat the heat storage means; and a blowing cycle wherein a process gas is fed through the second chamber to pick up heat from the heat storage means. According to an important aspect of the present invention, the heating cycle comprises the steps of feeding a first stream of fuel to the burner of the regenerative heater; feeding a second stream of fuel to a pre-combustion chamber; feeding oxygen to the pre-combustion chamber; allowing the second stream of fuel and the oxygen to interact so as to form oxidizing gas, preferably at high temperature; and feeding the oxidizing gas to the burner of the regenerative heater. At the end of the heating cycle, the supply of oxygen to the pre-combustion chamber is discontinued, while further feeding the second stream of fuel to the pre-combustion chamber and further feeding the first stream of fuel to the burner.

As the second stream of fuel continues to be fed into the pre-combustion chamber, the second stream of fuel reacts with the oxygen still present in the pre-combustion chamber to form the oxidizing gas. Additionally, any oxidizing gas still present in the pre-combustion chamber or the feedline between the pre-combustion chamber and the burner is pushed towards the burner of the regenerative heater, where the oxidizing gas is still being burnt by the first stream of fuel. As a consequence, the amount of oxygen in the system is gradually reduced until the system is essentially free from oxygen, i.e. there is no more oxygen in the pre-combustion chamber, the feedline or the burner. As no further oxygen is fed to the system, the oxygen is indeed being consumed from both ends, thereby leading to a rapid reduction in the oxygen concentration. No oxygen is pushed through the first or second chambers of the regenerative heater, thereby keeping the latter essentially free from oxygen. This allows to safely feed reducing gas through the regenerative heater during the blowing stage, without however having to purge the regenerative heater before each blowing cycle. It should be noted however that in the rest of the regenerative heater, a minimal amount of oxygen may be present because of a slightly over-stoichiometric burning of the second stream of fuel in the pre-combustion chamber. One important advantage of the above method is that the regenerative heater may be used for conventional use with cold blast air and for use with reducing gas, without having to modify the structure of the regenerative heater.

Preferably, the second stream of fuel is fed to the pre-combustion chamber until the oxygen in the pre-combustion chamber, in the burner and in a feed line between the pre-combustion chamber and the burner is consumed. In other words, the second stream of fuel is fed to the pre-combustion chamber until the burner no longer receives oxidizing gas, but the second stream of fuel.

In the context of the present invention, the oxygen may be considered to be essentially consumed if an oxygen concentration in the rest of the regenerative heater is less than 1%.

Once the oxygen is essentially consumed, the supply of fuel to the pre-combustion chamber and to the burner may be discontinued. It should however not be excluded that the supply of fuel is discontinued some time after the oxygen is essentially consumed.

Advantageously, at the beginning of the blowing cycle, the regenerative heater is pressurized and at the beginning of the heating cycle, the regenerative heater is depressurized. Preferably, process gas, i.e. reducing gas, is transferred from the regenerative heater to be de-pressurized to the regenerative heater to be pressurized.

The process gas is advantageously a CO rich process gas received from a $CO_2$ removal unit, which has a major part of its $CO_2$ content removed. If the $CO_2$ removal unit is a (V)PSA unit with cryogenic unit, the process gas is free from $CO_2$, whereas if the $CO_2$ removal unit is a (V)PSA unit without cryogenic unit, the process gas has reduced $CO_2$ content. The fuel is advantageously a $CO_2$ rich tail gas received from a $CO_2$ removal unit. Using the $CO_2$ rich tail gas from a $CO_2$ removal unit as fuel for the burner of the regenerative heater allows for a by-product of the $CO_2$ removal unit to be used in a cost effective manner. Indeed, this tail gas contains mainly $CO_2$, which is used for heating the regenerative burner. Although the gas exiting the regenerative burner during the heating cycle may contain some CO, it is mainly composed of $CO_2$ which leads to a more cost effective use of the subsequent cryogenic unit.

At the beginning of the heating cycle, the CO in the regenerative heater is pushed out of the regenerative heater by the hot flue gasses as CO containing off gas. Indeed, after the blowing cycle, CO is present in the regenerative heater. When the burner is started, this CO is pushed out of the regenerative heater through the opening in the lower portion of the second chamber.

Preferably the CO containing off gas is treated to remove its CO content before the off gas is evacuated. According to a first embodiment, the CO containing off gas may be fed to a cryogenic plant to remove the CO content and ensure that only $CO_2$ is pumped into the ground. Preferably however, the amount of CO in the CO containing off gas is measured and, as long as a presence of CO can be detected in the off gas, the latter is recycled.

According to a second embodiment, the CO containing off gas is fed back into a stream of tail gas, thereby allowing the CO to be reused in the tail gas in the pre-combustion chamber. According to a third embodiment, the CO containing off gas is fed, via a booster unit, back to a $CO_2$ removal unit, where the CO is then redirected into the process gas for heating. According to a fourth embodiment, the CO containing off gas is fed into a gas holder, from where it may used elsewhere in the steel making plant. The CO containing off gas may indeed be used as high calorific value gas to be fed into the first stream of fuel.

The fuel may according to the present invention be a tail gas rich in CO2, i.e. the tail gas coming from the $CO_2$ removal unit.

Advantageously, the tail gas is heated in a heat exchanger before it is divided into the first stream of fuel and the second stream of fuel. The hot flue gasses escaping the second chamber may be fed through the heat exchanger for transferring heat to the tail gas.

High calorific value gas may be fed into the first stream of fuel to improve the burning of the fuel in the burner of the regenerative heater. High calorific value gas may also be fed into the tail gas before it is fed into the heat exchanger in order to improve the ignition characteristics of the tail gas in the pre-combustion chamber.

BRIEF DESCRIPTION OF THE DRAWINGS

Preferred embodiments of the invention will now be described, by way of example, with reference to the accompanying drawings, in which:

FIG. 4 is a flow diagram showing the heating cycle of the method according to a fourth embodiment of the invention.

DETAILED DESCRIPTION

Figure 1:
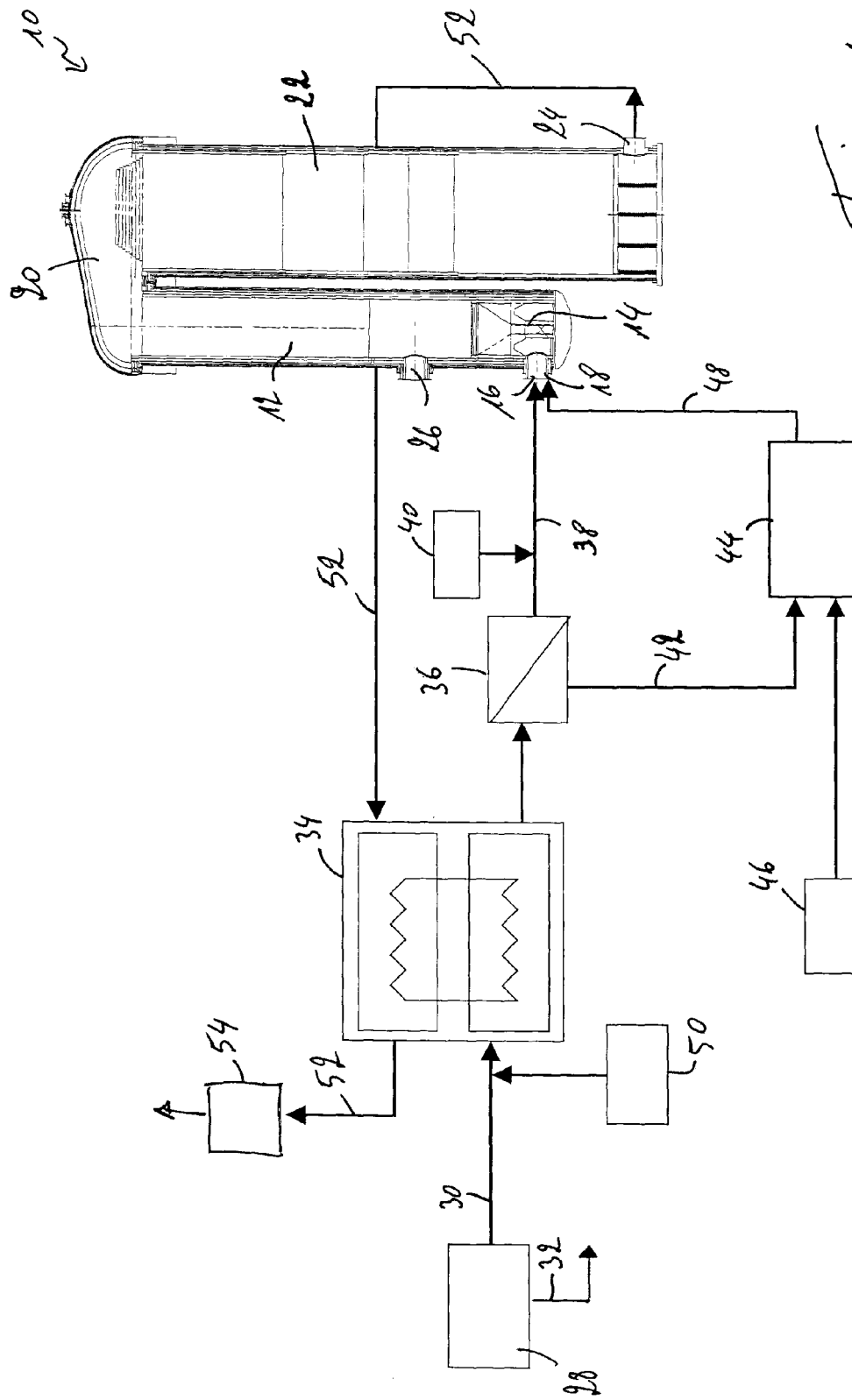
FIG. 1 is a flow diagram showing the heating cycle of the method according to a first embodiment of the invention.

FIG. 1 shows a flow diagram of the heating cycle of the method for operating a regenerative heater according to a first embodiment of the present invention. FIG. 1 also shows a schematic view of a regenerative heater 10 in the form of a hot blast stove.

Such a regenerative heater 10 generally comprises a first chamber 12 with a burner 14 arranged therein. During the heating cycle, fuel and oxidizing gas is fed to the burner 14 via two gas inlets 16, 18. The fuel and oxidizing gas are ignited and their combustion creates hot flue gasses, which ascend into a cupola 20. The cupola 20 deviates the hot flue gasses and feeds them into a second chamber 22 comprising a series of heat storage means, generally in the form of checker bricks (not shown). The hot flue gasses finally exit the regenerative heater 10 through an opening 24 in the lower portion of the second chamber 22.

During the subsequent blowing cycle, process gas is blown into the second chamber 22 through the opening 24 in the lower portion of the second chamber 22. As the process gas passes through the checker bricks, heat is transferred from the checker bricks to the process gas. At the top of the second chamber 22 the hot process gas is fed, via the cupola 20, into the first chamber 12. The hot process gas exits the regenerative heater 10 through a process gas outlet 26 and is fed into the blast furnace (not shown).

The structure of a regenerative heater 10 itself is generally well known to the skilled person and will therefore not be described in closer detail herein.

In blast furnace installations with top gas recycling, the top gas recovered from the blast furnace is cleaned and passed through a $CO_2$ removal unit 28 wherein $CO_2$ is removed from the top gas, generally by pressure swing adsorption (PSA) or vacuum pressure swing adsorption (VPSA). A (V)PSA installation divides the cleaned top gas into two separate gas streams: a $CO_2$ rich tail gas and a CO rich process gas. The CO rich tail gas is heated by feeding it through a regenerative heater before it is injected back into the blast furnace. According to the present invention, the tail gas 30, which is rich in $CO_2$ (but still contains CO), is enriched and used to fuel the burner 14 of the regenerative heater 10 during the heating cycle, whereas the CO rich process gas 32 is used as reducing gas.

The $CO_2$ rich tail gas coming from the $CO_2$ removal unit 28 is first fed through a heat exchanger 34 to heat the tail gas 30 before it is led to a distribution point 36. At the distribution point 36 the heated tail gas is split into two separate streams.

A first stream 38 of the tail gas is fed as fuel to the burner 14 after a high calorific value gas 40 is added.

A second stream 42 of the tail gas is fed to a pre-combustion chamber 44 into which oxygen 46 is further fed. In the pre-combustion chamber 44, the second stream 42 of the tail gas and the oxygen 46 interact so as to form oxidizing gas 48 at high temperature, which is then fed as oxidizing gas to the burner 14. Such oxidizing gas 48 may e.g. have a composition of mainly about 79% $CO_2$ and mainly about 21% $O_2$ (some impurities may be present). The first stream 38 of the tail gas and the oxidizing gas 48 are burnt in the first chamber 12 of the regenerative heater 10 and form the hot flue gasses necessary for heating the checker bricks in the second chamber 22. The hot flue gasses then exit the second chamber 22 through opening 24 and are preferably fed through the heat exchanger 34 to transfer heat from the hot flue gasses to the tail gas also passing through the heat exchanger 34. In order to facilitate ignition of the mixture of tail gas and oxygen in the pre-combustion chamber 44, high calorific value gas 50 may further be added to the tail gas before passing it through the heat exchanger 34.

As, in the blowing cycle, a reducing gas rich in CO is fed through the regenerative heater 10, it is important that the latter is free from oxidizing gas. The reducing gas and oxidizing gas would otherwise form a dangerous mixture that could ignite and damage the regenerative heater 10.

In order to ensure that no oxidizing gas is present during the blowing cycle, the present invention suggests that, at the end of the heating cycle, first the oxygen supply to the pre-combustion chamber 44 is stopped. Consequently, no more oxygen is fed into the system. However, oxygen is still present in the pre-combustion chamber 44, in the burner 14 and in the piping therebetween. It is therefore suggested to continue feeding the second stream 42 of the tail gas to the pre-combustion chamber 44, thereby continuing to consume oxygen in the pre-combustion chamber 44. Furthermore, the first stream 38 of the tail gas is also still fed to the burner 14, thereby continuing to consume oxygen in the burner 14.

While the fuel and oxidizing gas continue to burn in the burner 14, the second stream 42 of tail gas fed into the pre-combustion chamber 44 forces the oxidizing gas 48 further towards the burner 14. When all the oxidizing gas is gone and the second stream 42 of tail gas meets the first stream 38 of tail gas in the burner 14, the combustion stops because of the absence in oxidizing gas 48.

As no more oxidizing gas is present, the blowing cycle can begin safely, even if the gas fed through the regenerative heater 10 during the blowing cycle is a reducing gas, e.g. process gas rich in CO. There is almost no oxygen in the regenerative heater 10 that the process gas could react with. It is important to note that, with the present method, it is not necessary to purge the regenerative heater 10 when switching from the heating cycle to the blowing cycle. It is also important to note that, with the present method, it is not necessary to purge the regenerative heater 10 when switching from the blowing cycle to the heating cycle.

At the beginning of the heating cycle, the regenerative heater still contains CO rich process gas. The flue gasses coming from the burner 14 push the CO in the regenerative heater as CO containing off gas 52 out of the regenerative heater through the opening 24 in the lower portion of the second chamber 22. As the CO containing off gas 52 is hot, it is preferably fed through the heat exchanger 34 to transfer heat from the CO containing off gas 52 to the tail gas 30. After passing through the heat exchanger 34, the CO containing off gas 52 is, according to the embodiment of FIG. 1 fed to a cryogenic unit 54 for removing CO which may then be uses elsewhere.

Figure 2:
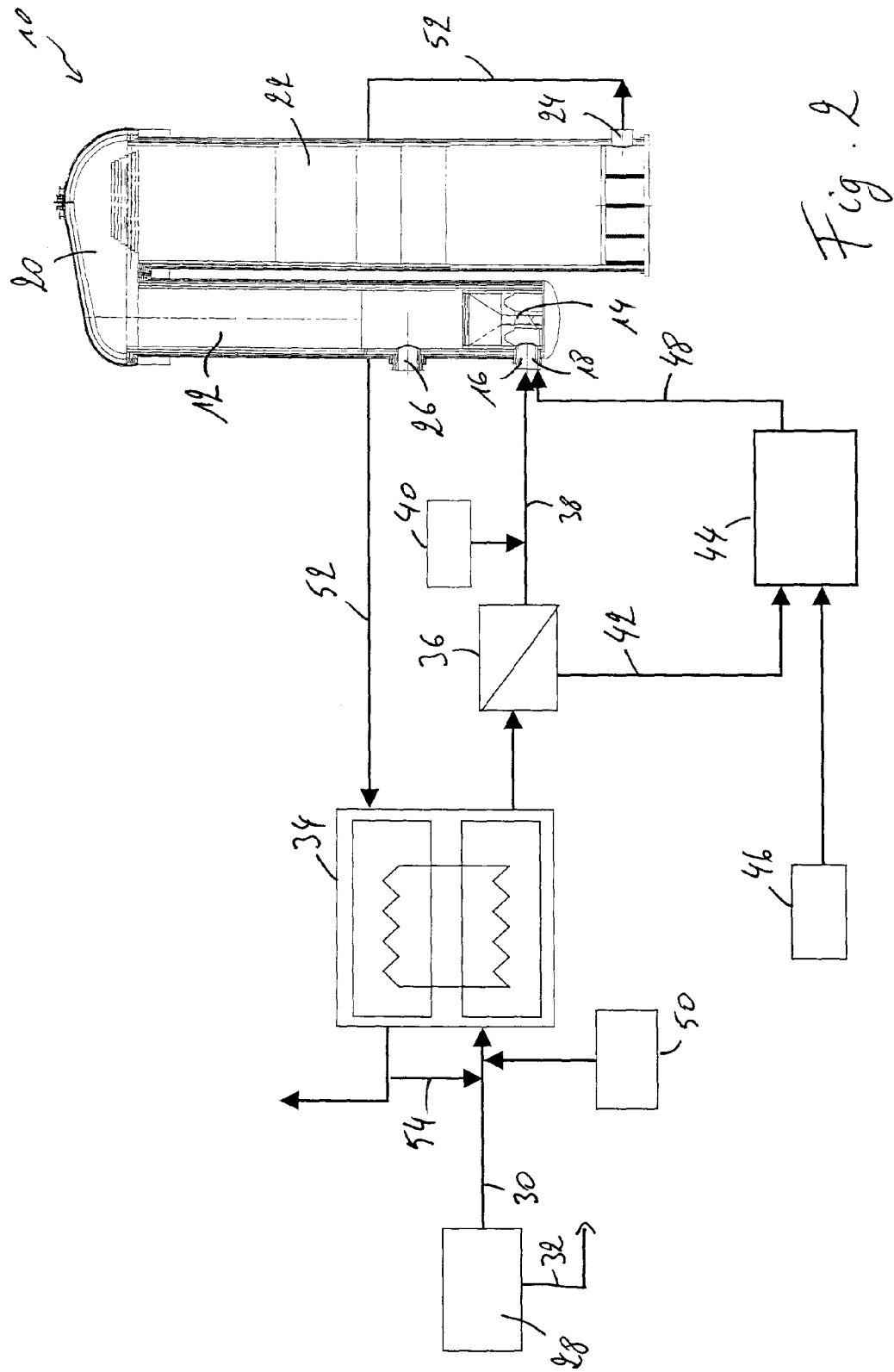
FIG. 2 is a flow diagram showing the heating cycle of the method according to a second embodiment of the invention.

FIG. 2 shows a flow diagram of the heating cycle of the method for operating a regenerative heater according to a second embodiment of the present invention. This flow diagram is very similar to the one shown in FIG. 1 and will therefore not be described in detail. In this second embodiment, the amount of CO in the CO containing off gas 52 is measured and, as long as a presence of CO can be detected in the CO containing off gas 52, the CO containing off gas 52 is fed as recycled CO containing gas 54 back into the tail gas 30.

Figure 3:
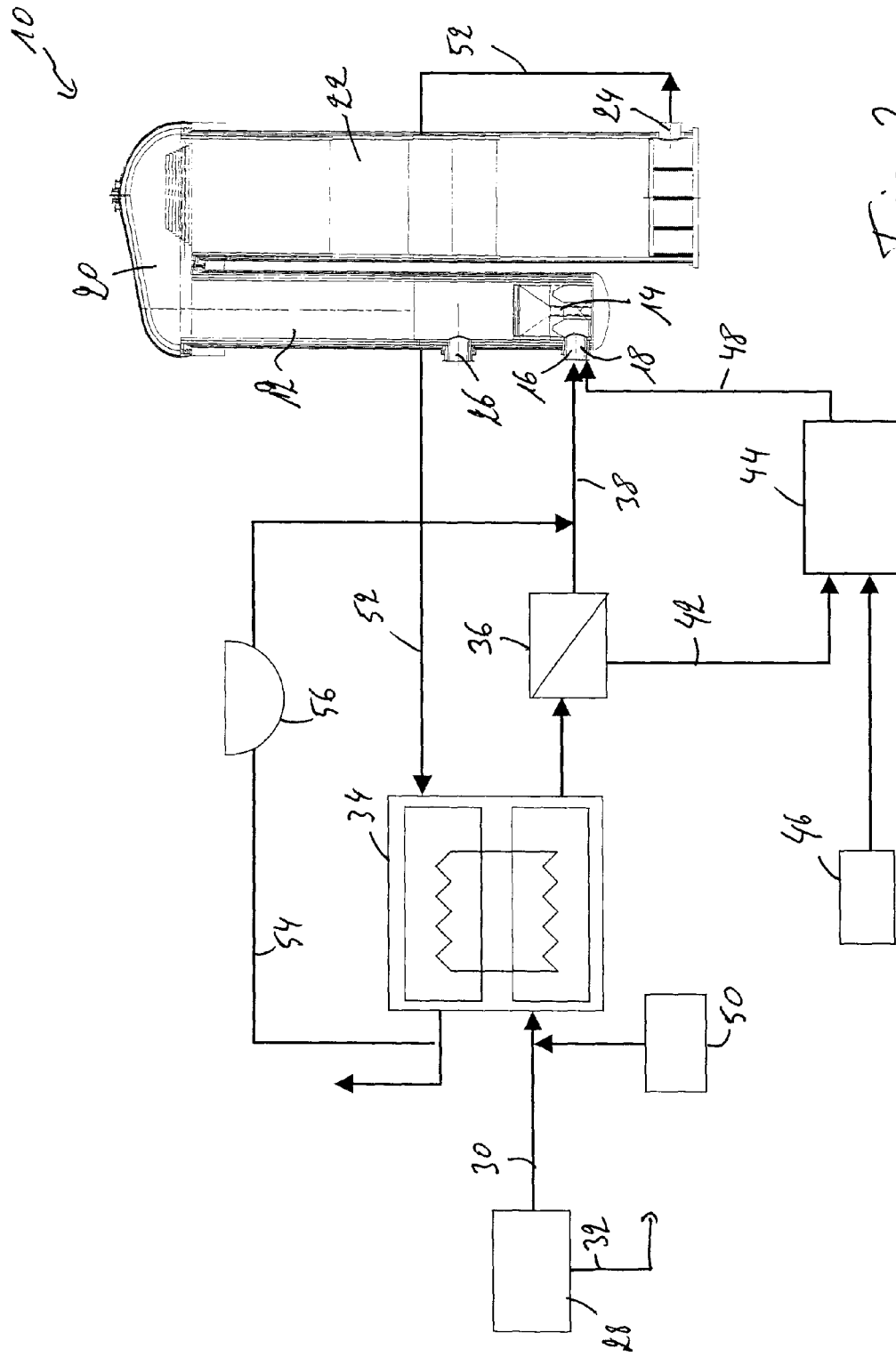
FIG. 3 is a flow diagram showing the heating cycle of the method according to a third embodiment of the invention.

FIG. 3 shows a flow diagram of the heating cycle of the method for operating a regenerative heater according to a third embodiment of the present invention. This flow diagram is very similar to the one shown in FIG. 1 and will therefore not be described in detail. In this third embodiment, the amount of CO in the CO containing off gas 52 is measured and, as long as a presence of CO can be detected in the CO containing off gas 52, the CO containing off gas 52 is fed as recycled CO containing gas 54 into a gas holder 56. The recycled CO containing gas 54 from the gas holder 56 may be used elsewhere in the steel making plant. As shown in FIG. 3, it may e.g. be fed as high calorific value gas into the first stream of tail gas 38.

FIG. 4 shows a flow diagram of the heating cycle of the method for operating a regenerative heater according to a fourth embodiment of the present invention. This flow diagram is very similar to the one shown in FIG. 1 and will therefore not be described in detail. In this fourth embodiment, the amount of CO in the CO containing off gas 52 is measured and, as long as a presence of CO can be detected in the CO containing off gas 52, the CO containing off gas 52 is fed into the $CO_2$ removing unit 28 via a booster unit 58. In the $CO_2$ removing unit 28 the CO from the CO containing off gas 52 if fed into the process gas 32.

The invention claimed is:

1. A method for operating a regenerative heater comprising a first chamber and a second chamber, the first chamber having a burner arranged therein, the second chamber comprising heat storage means; said method comprising:
   a heating cycle wherein fuel and oxidizing gas are fed to said burner of the first chamber and allowed to burn and wherein hot flue gasses are led through the second chamber to heat said heat storage means; and
   a blowing cycle wherein a process gas is fed through the second chamber to pick up heat from the heat storage means wherein the heating cycle comprises the following steps:
      feeding a first stream of fuel to said burner of the regenerative heater;
      feeding a second stream of fuel to a pre-combustion chamber;
      feeding oxygen to said pre-combustion chamber;
      allowing said second stream of fuel and said oxygen to interact so as to form oxidizing gas;
      feeding said oxidizing gas to said burner of said regenerative heater,
   wherein, at the end of said heating cycle, the supply of oxygen to said pre-combustion chamber is discontinued, while further feeding said second stream of fuel to said pre-combustion chamber and further feeding said first stream of fuel to said burner.

2. The method according to claim 1, wherein said second stream of fuel is fed to said pre-combustion chamber until said oxygen in said pre-combustion chamber, in said burner and in a feed line between said pre-combustion chamber and said burner is essentially consumed.

3. The method according to claim 2, wherein said oxygen is considered to be essentially consumed if an oxygen concentration in the first and second chambers is less than 1%.

4. The method according to claim 2, wherein, once said oxygen is essentially consumed, the supply of fuel to said pre-combustion chamber and to said burner is discontinued.

5. The method according to claim 1, wherein,
at a beginning of said blowing cycle, said regenerative heater is pressurized; and
at a beginning of said heating cycle, said regenerative heater is depressurized.

6. The method according to claim 5, wherein process gas is transferred from said regenerative heater to be de-pressurized to said regenerative heater to be pressurized.

7. The method according to claim 1, wherein said process gas is a CO rich process gas provided by a $CO_2$ removal unit and said fuel is a $CO_2$ rich tail gas provided by said $CO_2$ removal unit.

8. The method according to claim 7, wherein, at a beginning of the heating cycle, said CO in said regenerative heater is pushed out of said regenerative heater by said hot flue gasses as CO containing off gas.

9. The method according to claim 8, wherein
said off gas is fed to a cryogenic plant; and/or
said off gas is fed back into a stream of tail gas; and/or
said off gas is fed back to a $CO_2$ removal unit via a booster unit; and/or
said off gas is fed into a gas holder for use as high calorific value gas to be fed into
said first stream of fuel.

10. The method according to claim 9, wherein said $CO_2$ rich tail gas is heated in a heat exchanger before it is divided into said first stream of fuel and said second stream of fuel.

11. The method according to claim 10, wherein said hot flue gasses escaping said second chamber are fed through said heat exchanger for transferring heat to said tail gas.

12. The method according to claim 9, wherein high calorific value gas is fed into said first stream of fuel.

13. The method according to claim 9, wherein high calorific value gas is added to said tail gas before it is divided into said first and second streams of fuel.

* * * * *